United States Patent [19]

San George et al.

[11] Patent Number: 4,719,540
[45] Date of Patent: Jan. 12, 1988

[54] UNITIZED MOUNTING DEVICE FOR MOUNTING ELECTRICAL COMPONENTS OF A LUMINAIRE

[75] Inventors: Mark San George; Robert L. Ewing; Mark A. Rhodes; Robert D. Zeller, all of Newark, Ohio

[73] Assignee: Manville Corporation, Denver, Colo.

[21] Appl. No.: 885,906

[22] Filed: Jul. 15, 1986

[51] Int. Cl.$^4$ .............................................. H02B 1/10
[52] U.S. Cl. .............................. 361/377; 174/DIG. 2; 361/386
[58] Field of Search ............................. 361/386, 377; 174/DIG. 2

[56] References Cited

U.S. PATENT DOCUMENTS 3,243,659 3/1966 Bostonian .............................. 361/377

Primary Examiner—G. P. Tolin
Assistant Examiner—Morris Ginsburg
Attorney, Agent, or Firm—John D. Lister; Cornelius P. Quinn

[57] ABSTRACT

A unitized electrical component mounting device and no more than three fasteners quickly secures a capacitor, a starter and a ballast in their preferred positions within a housing. Versatility is provided by providing for detachable appendages of different sizes for securing ballasts of different sizes in place within the housing.

8 Claims, 9 Drawing Figures

UNITIZED MOUNTING DEVICE FOR MOUNTING ELECTRICAL COMPONENTS OF A LUMINAIRE

This invention relates to an improved mounting device for mounting the electrical components of a luminaire.

DISCUSSION OF THE PRIOR ART

In luminaires prior to the present invention the electrical components of the luminaire such as the ballast, the capacitor and the starter were all independently mounted in the luminaire. In assembling the luminaire each component was separate and each required its own mounting screws.

It is an object of the present invention to greatly decrease the number of mounting screws needed for mounting the electrical components of a luminaire.

It is another object of the present invention to provide a device for mounting electrical components of a luminaire which provides for easier and more economical assembly of a luminaire.

It is another object of the present invention to provide a device for mounting electrical components of a luminaire which involves less pieces which the assembler has to work with.

It is still another object of the present invention to provide a device for mounting electrical components of a luminaire which provides for the substitution or interchange of different sized components.

SUMMARY OF THE INVENTION

The present invention is directed to a new and improved mounting arrangement for electrical components in a luminaire where a unitized member is adapted to secure the ballast, the starter and the capacitor all in their respective positions.

DETAILED DESCRIPTION OF THE PREFERRED EMBODIMENT

Figure 1:
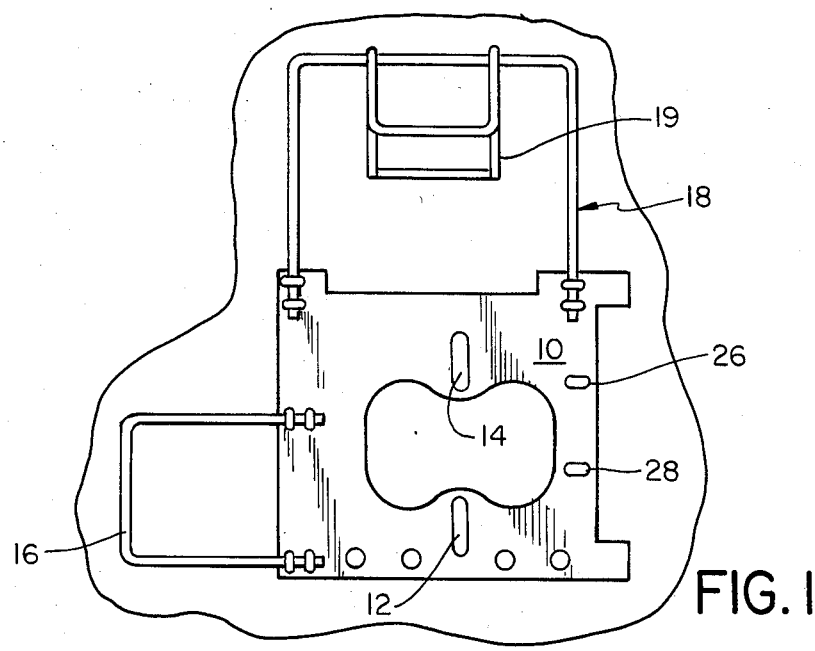
FIG. 1 is a plan view of a unitized component strap having appendages for securing a capacitor and a starter in place in a luminaire.

Referring now to the drawings there is shown in FIG. 1 a central plate 10 to which is connected a number of appendages for engaging and securing electrical components. A pair of longitudinal slots 12 and 14 formed in the central plate 10 are for receiving mounting screws to fasten and align the central plate 10 to and within an electrical housing.

Figure 2:
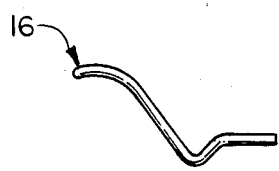
FIG. 2 is a front elevation view illustrating a portion of the unitized component illustrated in FIG. 1 that is used to secure a capacitor in place.
Figure 3:
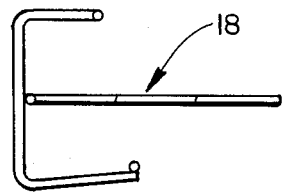
FIG. 3 is a side view illustrating a portion of the unitized component illustrated in FIG. 1 that is used to secure a starter in place.

As shown in FIGS. 1 and 2, an appendage 16 of spring-like material such as spring steel or the like extends outwardly from the central plate 10 to engage a capacitor. As shown in FIGS. 1 and 3 another appendage 18 of spring like material such as spring steel or the like extends outwardly from the central plate 10 to a U-shaped portion 19 formed thereon for partially enclosing a starter and suspending it in mid air.

Figures 4, 5:
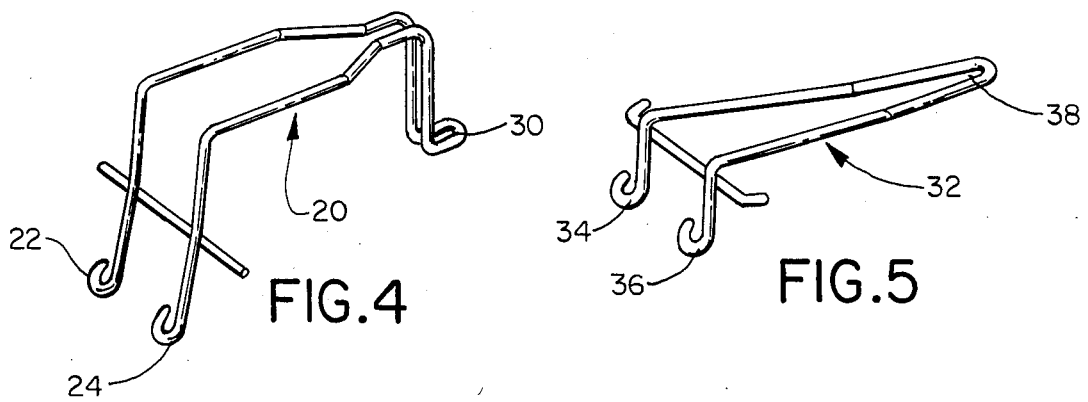
FIG. 4 is a perspective view of an appendage which is adapted to engage with and extend from the unitized component illustrated in FIG. 1 to secure a 3×4 ballast in place.
FIG. 5 is a perspective view of an appendage which is adapted to engage with and extend from the unitized component illustrated in FIG. 1 to secure a reactor ballast in place.

There is shown in FIG. 4 an appendage generally identified by the reference numeral 20 for securing a 3×4 ballast. The appendage 20 is made of spring-like material such as spring steel or the like and is formed at one end into a pair of hooks 22 and 24 for engaging slots 26 and 28 formed in the central plate 10. The appendage 20 is formed to extend upward from the center plate 10 over and then downward so as to form a slot 30 for receiving a mounting screw. Appendage 20 is formed to secure a 3×4 ballast in place.

As shown in FIG. 5 there is shown another appendage generally identified by the reference numeral 32. This appendage just like appendage 20 is formed into a pair of hooks 34 and 36 at one end for engaging slots 26 and 28 in the central plate 10. The appendage 32 just like appendage 20 forms a slot 38 for receiving a mounting screw but unlike appendage 20 it does not extend upward as far since it is adapted to secure a reactor ballast in place which is smaller in size than a 3×4 ballast.

Figure 6:
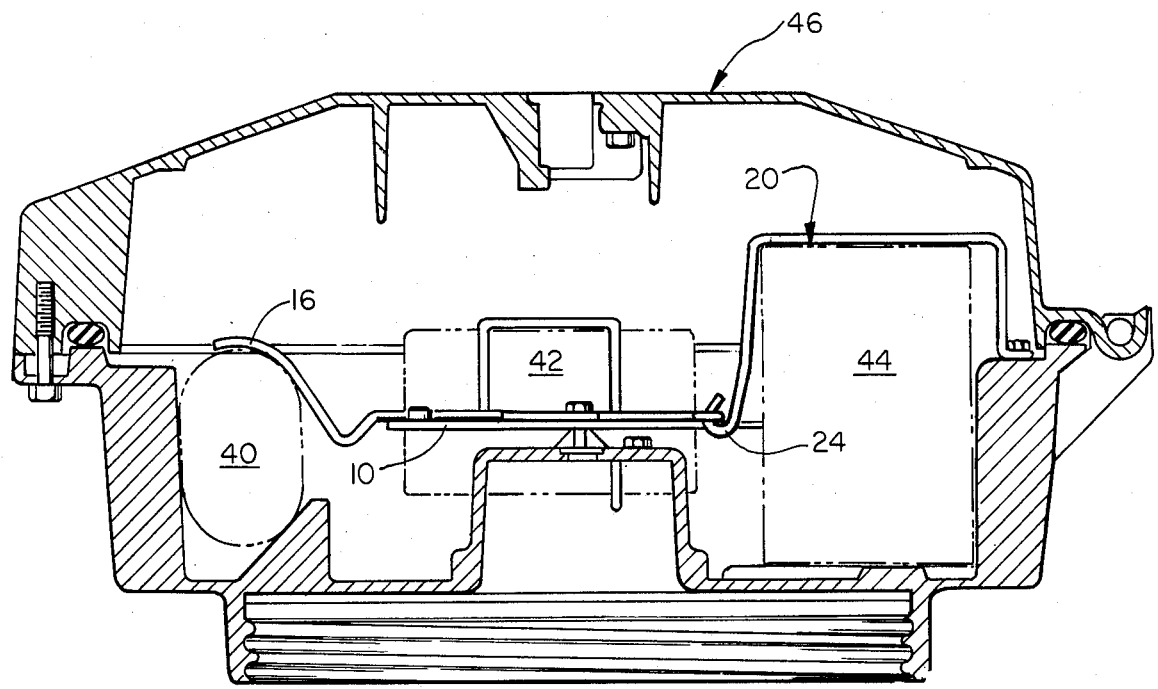
FIG. 6 is a cross section of an electrical housing of a luminaire in which is illustrated a front view of the unitized component of FIG. 1 in conjunction with the appendage of FIG. 4, securing a capacitor, a starter and a 3×4 ballast in place within the electrical housing.
Figure 7:
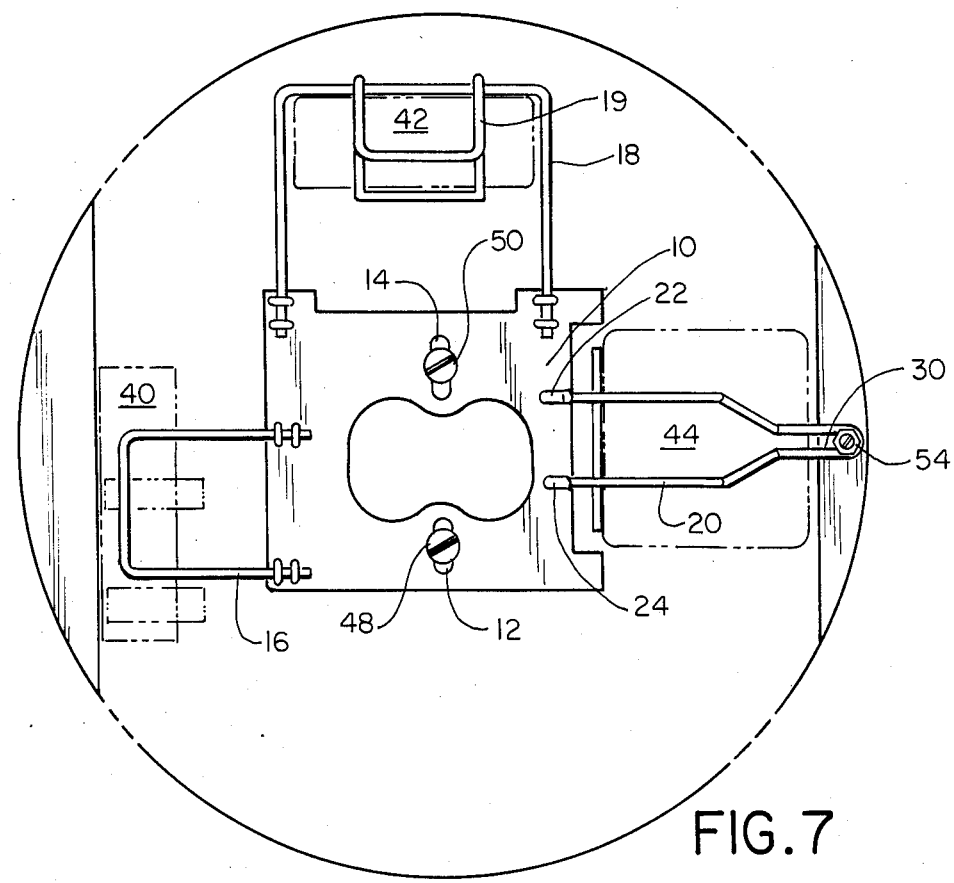
FIG. 7 is a plan view of the unitized electrical mounting device as illustrated in FIG. 6 securing a capacitor, a starter and a 3×4 ballast in place within the electrical housing.

Turning now to FIGS. 6 and 7 there is illustrated the unitized electrical mounting device of the present invention securing a capacitor 40 shown in phantom, a starter 42 shown in phantom and a 3×4 ballast shown in phantom all secured in place within a luminaire electrical housing generally identified by the reference numeral 46.

Figure 8:
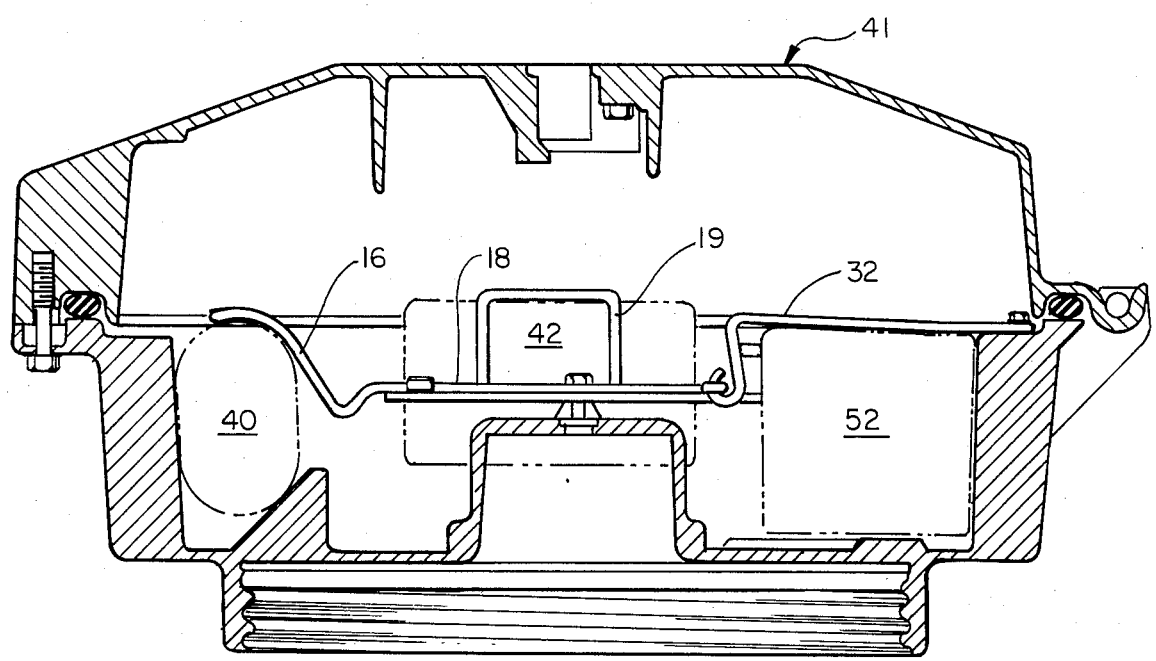
FIG. 8 is a cross-section of an electrical housing of a luminaire in which is illustrated a front view of the unitized component of FIG. 1 in conjunction with the appendage of FIG. 5 securing a capacitor, a starter and a reactor ballast in place with the electrical housing.
Figure 9:
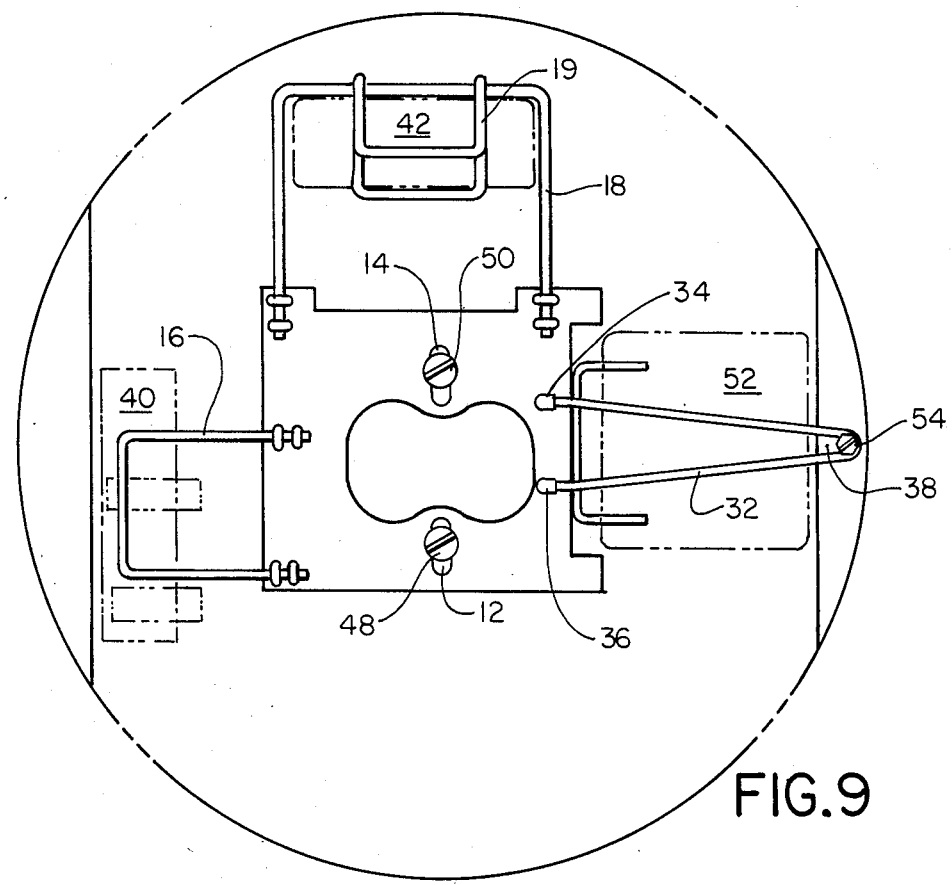
FIG. 9 is a plan view of the unitized electrical mounting device as illustrated in FIG. 8 securing a capacitor, a starter and a reactor ballast in place within the electrical housing.

Similarly, in FIGS. 8 and 9 there is illustrated the unitized electrical mounting device of the present invention securing a capacitor 40 shown in phantom, a starter 42, shown in phantom and a reactor ballast 52 shown in phantom all secured in place within a luminaire electrical housing generally identified by the reference numeral 46.

The central plate 10 is secured to the luminaire electrical housing 46 by mounting screws 48 and 50 which are received in longitudinal slots 12 and 14 and are screwed into the housing 46.

The appendages 16 and 18 are welded or otherwise physically attached to the center plate 10. The appendage 16 secures the capacitor 40 against the side of the luminaire electrical housing 46 thereby providing a heat sink for the capacitor 40. The appendage 18 on the other hand secures the starter 42 so it is suspended in mid air thereby isolating it from any hot spots in the luminaire electrical housing 46.

A mounting screw 54 is fastened through the slot 30 formed in the appendage 20 or slot 38 formed in the appendage 32 into the luminaire electrical housing to hold the appendages 32 or 20 in place depending on which ballast is being used. In either event whether the ballast is a 3×4 ballast 44 or a reactor ballast 52 the ballast is held in contact with the side of the luminaire electrical housing 46, the luminaire electrical housing thereby providing a heat sink for the ballast.

Thus, it can be readily seen that the present invention provides ease of assembly in as much as the assembly with the unitized electrical component mounting device and three mounting screws can quickly secure a capacitor, a starter and a ballast in their preferred positions. The present invention also provides versatility in that different sized appendages are interchangeable to accommodate different sized ballasts.

While the invention has been particularly shown and described in reference to a preferred embodiment thereof, it will be understood by those skilled in the art that various changes in form and details may be made therein without departing from the spirit and scope of the invention.

What is claimed is:

1. A unitized mounting device securing electrical components of a luminaire such as a ballast, a starter and a capacitor in desired positions in a luminaire housing comprising a central plate adapted to be mounted to the luminaire housing means connected to said central plate securing a capacitor in place and into contact with an inner wall of said housing, means connected to said central plate suspending a starter in place in mid air and means connected to said central plate securing a ballast in place and into contact with said inner wall of said housing.

2. A unitized mounting device as defined in claim 1 wherein no more than three fasteners are used to mount the unitized mounting device to said housing.

3. A unitized mounting device as defined in claim 1 wherein said means securing a capacitor in place and into contact with an inner wall of said housing is welded to said central plate.

4. A unitized mounting device as defined in claim 3 wherein said means suspending a starter in place in mid air includes spring-like means holding said starter in a desired position.

5. A unitized mounting device as defined in claim 3 wherein said means securing said ballast in place and into contact with said inner wall is detachable from said central plate in order that when different sized ballasts are used different means securing the ballast in place and into contact with said inner wall of said housing may be used.

6. A unitized mounting device as defined in claim 5 wherein said means securing said ballast in place and into contact with said inner wall has a slot formed therein for receiving a fastener to connect it to said housing.

7. A unitized mounting device as defined in claim 6 wherein said means securing a capacitor in place and into contact with said inner wall of said housing includes a spring-like member which biases the capacitor toward said inner wall.

8. A unitized mounting device as defined in claim 7 wherein said unitized mounting device is adapted to be mounted on said housing in such a manner as to have said housing serve as a heat sink for said capacitor and said ballast.

* * * * *